United States Patent [19]
Aalto

[11] Patent Number: 5,194,733
[45] Date of Patent: Mar. 16, 1993

[54] MULTIPURPOSE GAMMA COUNTER AND METHOD FOR SAMPLE HANDLING IN GAMMA MEASUREMENT

[75] Inventor: Juhani Aalto, Turku, Finland

[73] Assignee: Wallac OY, Turku, Finland

[21] Appl. No.: 761,941

[22] PCT Filed: Mar. 21, 1990

[86] PCT No.: PCT/FI90/00069
§ 371 Date: Sep. 23, 1991
§ 102(e) Date: Sep. 23, 1991

[87] PCT Pub. No.: WO90/11534
PCT Pub. Date: Oct. 4, 1990

[30] Foreign Application Priority Data
Mar. 22, 1989 [FI] Finland .................................. 891350

[51] Int. Cl.⁵ .............................................. G01T 7/08
[52] U.S. Cl. .................................................. 250/328
[58] Field of Search ....................... 422/63, 65, 67, 71; 250/328

[56] References Cited
U.S. PATENT DOCUMENTS
3,855,473 12/1974 Burgess et al. ...................... 250/328
4,005,292  1/1977 Oesterlin et al. ................ 250/328 X
4,057,148 11/1977 Meyer et al. ..................... 250/328 X FOREIGN PATENT DOCUMENTS
1466882  1/1967 France ................................. 250/328

Primary Examiner—Constantine Hannaher
Assistant Examiner—Edward J. Glick

[57] ABSTRACT

A multipurpose gamma counter enabling measurement of one sample at a time or alternatively two or more samples at a time and a method for sample handling in gamma measuring. The gamma counter is characterized in that the measuring unit and/or the grip unit for the sample containers are fully or partly formed of replaceable modules so that one or more necessary modular units can be fitted on the gamma counter depending on the measuring method in use at each time. The method is characterized in that, if the samples are research samples, they are measured one at a time in the detector of the research measuring chamber module and, if the samples are RIA samples, they are measured in the first place at least two at a time in the detector of the RIA measuring chamber module.

10 Claims, 8 Drawing Sheets

MULTIPURPOSE GAMMA COUNTER AND METHOD FOR SAMPLE HANDLING IN GAMMA MEASUREMENT

The invention relates to a multipurpose gamma counter enabling measurement of one sample at a time or alternatively two or more samples at a time.

Gamma counter measurements of radioactive samples are commonly conducted using either RIA (Radio Immuno Assay) devices, then the question usually being of a mass survey, or research devices, the question being of a single research of a small series only. RIA devices must be fast and therefore they handle several samples simultaneously. A research device need not be so fast but samples may, instead, be in containers or cassettes of different sizes. The radioactive isotope of the samples may also emit high energy radiation and therefore the detector of a research device must be larger and the lead shield must be much better than in a RIA device.

Either well-type or diametrically through hole-type detectors are generally used in counters. Well-type detectors are provided with a hollow, formed in the detector material, in which the sample is inserted. In hole-type detectors a hole goes through the detector material into which the sample is lifted. A well-type detector is easier to manufacture. It also has better efficiency and it is easier to shield than a hole-type detector.

Known gamma counters have been disclosed e.g. in the U.S. Pat. publications 4 029 961 and 4 035,642. In these devices, the sample vials to be measured have been placed in cassettes of ten vials and the measuring device takes one cassette at a time for measuring. As there are ten gamma detectors in the device, all samples vials in the cassette can be measured simultaneously. However, this kind of device is only suitable for use in RIA measurements because it would because too large and expensive for use in research if manufactured using know techniques. Moreover, one cannot use a well-type detector in this kind of device because the sample is lifted into the detector.

For economical reasons, research devices have only one large and well shielded detector. Since it has not been possible to combine RIA devices and research devices, those isotope laboratories which want to do both RIA counting and actual gamma research have been forced to purchase two separate counters. Therefore, for economical reasons, counters are also manufactured with 1, 2, or 4 detectors. They are larger and better shielded than necessary in actual RIA work and therefore they can, to a certain extent, be also used in research work. However, the drawback in RIA work is lower speed compared to actual RIA devices and limited efficiency in research work. Furthermore, the volume of samples cannot exceed that of RIA samples.

The object of this invention is to provide a new gamma counter which does not have the above mentioned drawbacks. The gamma counter according to the invention is characterized in that the measuring unit and/or the grip unit of the sample containers are fully or partly formed of replaceable modules so that one or more necessary modular units can be fitted on the gamma counter depending on the measuring method in use at each time.

The object of the invention is also to provide a new method for sample handling in gamma measuring. The method is characterized in that samples are moved to such a gamma counter which has at least two measuring chamber modules (51, 52), at least one of which is a research measuring chamber module (51) and at least one is a RIA measuring chamber module (52), that every sample in the gamma counter is identified whether the sample in question is a research sample or a RIA sample, that samples identified as research samples are moved one at a time into the detector of the research measuring chamber module (51) for measuring, and that samples identified as RIA samples are moved many at a time into the detector of the RIA measuring chamber module (52) for measuring.

Thus the best method can always be chosen depending on the situation. The sample containers for research samples can be in cassettes of different sizes, but sample containers for RIA samples can be only in cassettes of the same size.

The other characteristics of the invention have been set forth in the ensuing claims.

BRIEF DESCRIPTION OF THE DRAWINGS

The invention will now be described by means of examples with reference to the accompanying drawings, in which.

DETAILED DESCRIPTION OF THE PREFERRED EMBODIMENTS

Figure 1:
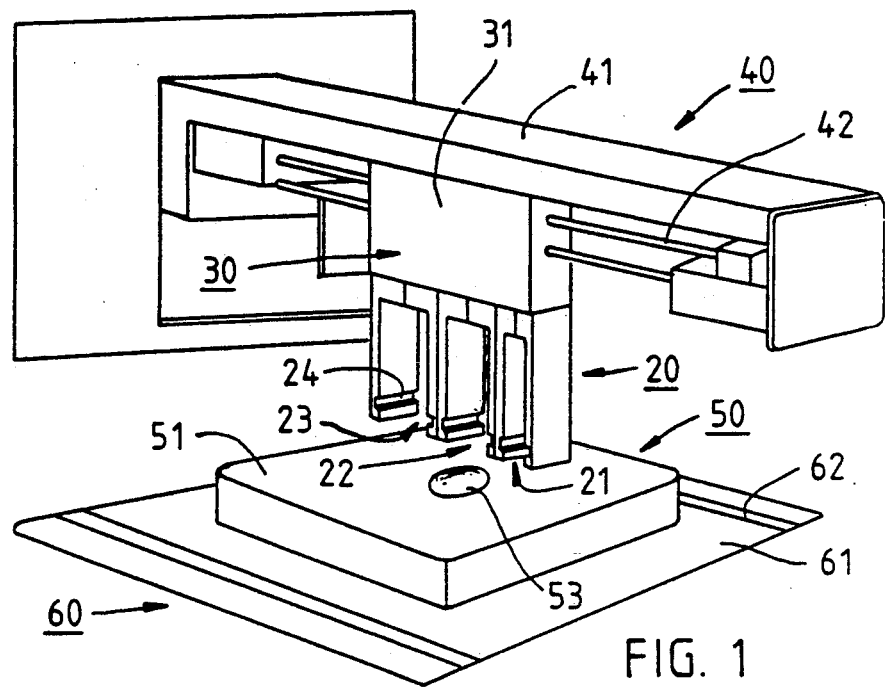
FIG. 1 shows an axonometric view of a gamma counter according to the invention.

FIG. 1 shows an axonometric view of a gamma counter according to the invention, the principal functional parts being a measuring unit 50 and a lifting device 40 consisting of a transfer unit 30 and a grip unit 20, belonging thereto, for the sample container holders. The transfer device unit 30 is mounted on a cantilever beam 41 which can be moved in the vertical direction in order to lift a sample container holder out of the sample container cassette and to lower it into the measuring unit 50.

The grip unit consists of a slide 31 moving on a horizontal guide bar 42, the slide having three pairs of grip nails 24 attached thereto. These form the three grip elements 21, 22, and 23 of different sizes for gripping the holders, being of different widths, of the sample containers of different sizes.

The measuring chamber 51 of the measuring unit 50 is provided with only a single big hole 53 for the detector. The gamma counter in FIG. 1 is, therefore, meant for use in research and it can take sample containers of different sizes in cassettes of different sizes one at a time for analysis. Generally in research use there is no need to measure many samples simultaneously. Instead, the radioactive isotope of the samples may emit high energy radiation and therefore the detector of a research device must be large and the lead shield must be massive and thick-walled.

Figure 2:
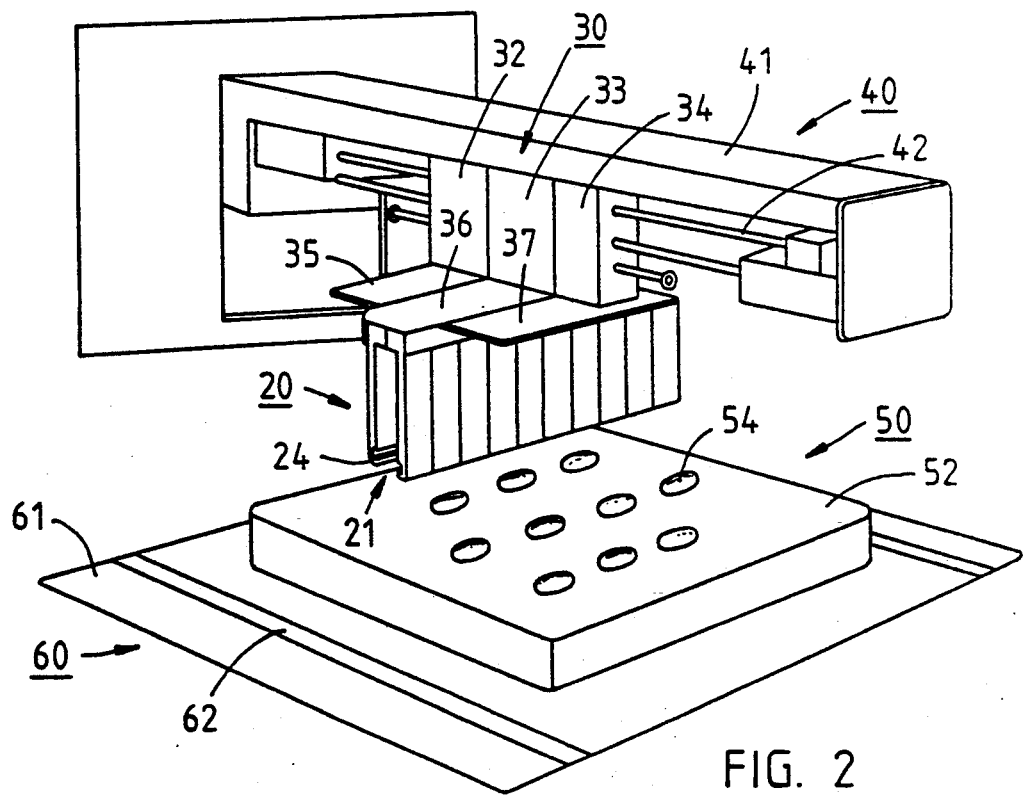
FIG. 2 corresponds to FIG. 1 and shows another embodiment of the gamma counter.

FIG. 2 corresponds to FIG. 1 but this gamma counter has been changed for use in RIA (Radio Immuno Assay), in other words, for use in mass survey. In this embodiment, the measuring unit 50 contains a measuring chamber 52 with ten detectors 54, there being no need for as massive and thick-walled lead shield as in the research device of FIG. 1.

The lifting device 40 is designed so that it can lift ten sample container holders simultaneously. The cantilever beam 41 is the same as that of the gamma counter of FIG. 1 and can be moved in vertical direction in order to lift the sample container holders out of the sample container holder cassette and to lower them into the measuring unit 50. The transfer unit 30 and the grip unit 20, belonging thereto, are different, however. The guide bar 42 of the cantilever beam 41 has been provided with three slides 32, 33, and 34, mounting plates 35, 36, and 37 for the grip elements being attached thereto. The grip elements 21 are composed of ten pairs of grip nails 24, being attached to these mounting plates. The distance between the grip nails is the same in all of them and therefore they can grip only a sample container holder of a predetermined size.

Operation of the devices of FIGS. 1 and 2 is described in more detail in the following figures.

Figure 3:
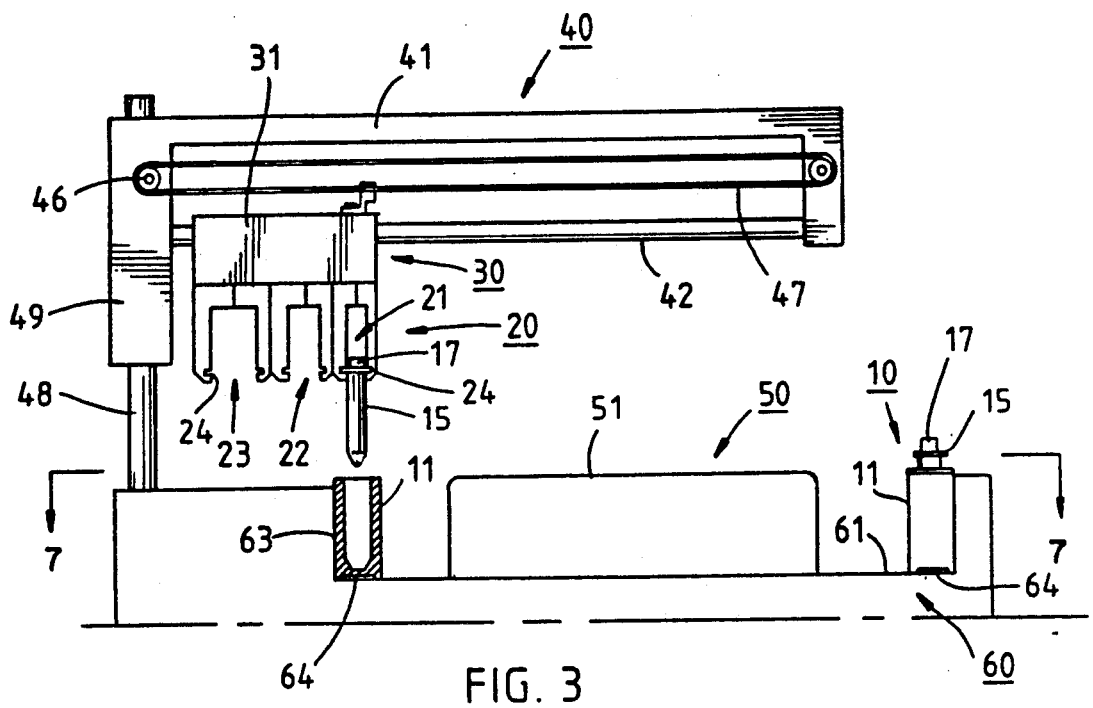
FIG. 3 shows the gamma counter of FIG. 1 viewed from the side.

FIG. 3 shows the main parts of the counter of FIG. 1 viewed from the side. Sample units 10 comprising sample container cassettes 11, which contain sample container holders 15 and, inside them, sample containers 17 containing a sample to be measured, are placed in the cassette transfer unit 60 on the measuring table 61, being in connection with a conveyor which moves one cassette at a time to a position for lifting the sample container holders. In FIG. 3 its location is in the left corner of the measuring table 61, the cassette 11 being shown as a cross-sectional view. In this gamma counter, one can use sample containers and their cassettes of three different sizes because the grip unit 20 has three grip elements 21, 22, and 23 of different sizes.

The lifting device 40 accomplishes the transfer of sample container holders to the measuring unit 50 for measuring. The transfer unit 30 is moved on a horizontal guide bar 42 of the cantilever beam 41 by means of a cogged belt and an electric motor 46. Based on information obtained from a cassette identifier, located on the cassette path before the measuring point, the slide 31 in the transfer unit 30 moves so that a grip element of the right size is right above the cassette. It can be seen in the figure that the smallest of the grip elements 21, 22 and 23 has been selected, i.e., the one with the reference number 21. The grip nails 24 will subsequently lift the sample container holder 15 out of the cassette 11. The vertical movement has been arranged so that the whole cantilever beam 41 rises on the guide bars 48 inside support 49.

Figure 4:
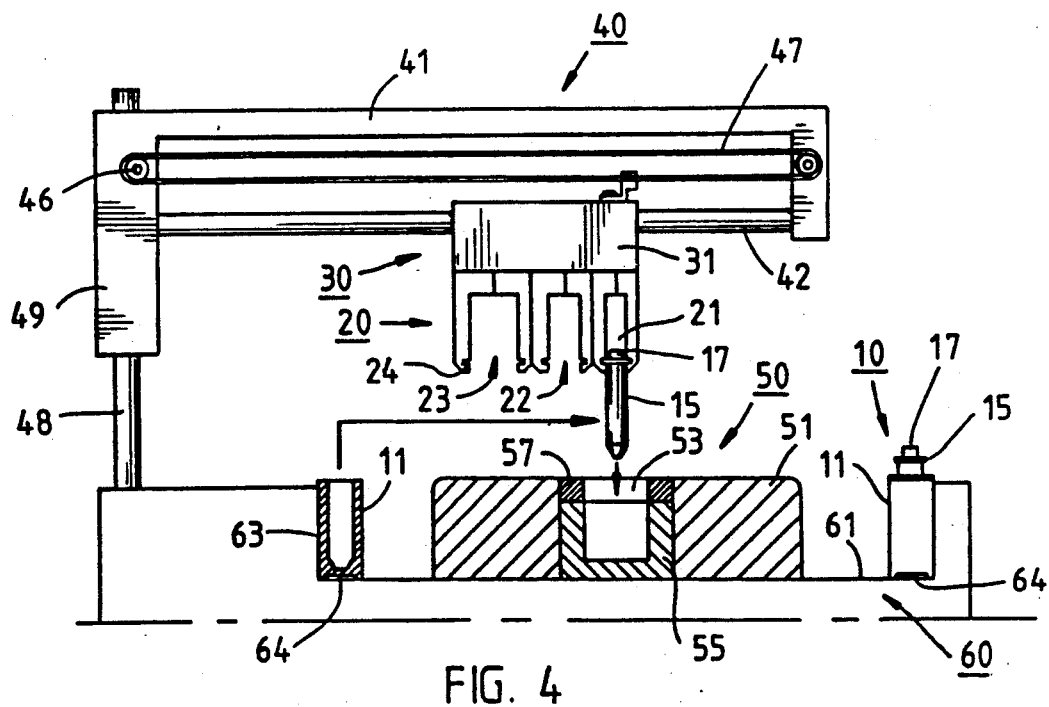
FIG. 4 corresponds to FIG. 3 and shows the gamma counter moving a sample container holder into the measuring unit.

FIG. 4 illustrates a situation where the transfer unit 30 of the gamma counter has moved the sample container holder 15 of the sample container 17 in a horizontal direction right above the measuring hole 53 of the measuring unit 50. After this, the cantilever beam 41 on the whole is lowered, the sample container holder 15 goes down into the measuring hollow 53 of the well-type detector 55. The measuring unit 50 has such a construction that the measuring chamber 51, being made of lead, is provided with a hollow of the same size as the detector 55. The detector 55 has been installed by lowering it downward from above into its hollow and mounting a protective ring 57 on top. The advantage of the construction is that, whenever necessary, one can easily change the detector 55 from above.

Figure 5:
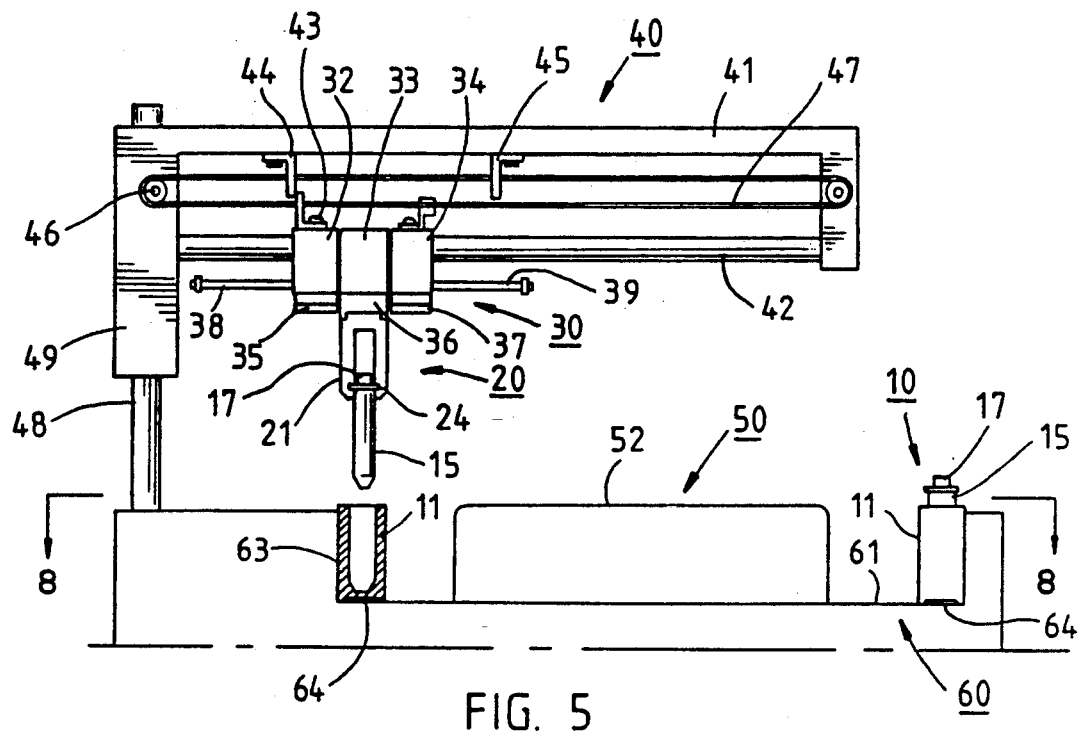
FIG. 5 shows the gamma counter of FIG. 2 viewed from the side.

FIG. 5 is similar to FIG. 3 and shows the gamma counter of FIG. 2 viewed from the side. Sample units 10 including sample container cassette 11, which comprises sample container holders 15 and, inside them, sample containers 17 containing sample, are placed in the cassette transfer unit 60 on the measuring table 61, being in connection with a conveyor which moves one cassette at a time to a position for lifting the sample container holders. In FIG. 5 the location of the cassette is in the left corner of the measuring table 61. In this gamma counter, one can use only sample containers and their cassettes of one size because all of the ten grip elements 21 in the grip unit 20 are of the same size.

The lifting device 40 accomplishes the transfer of sample container holders 15 to the measuring unit 50 for measuring. The transfer unit 30 is moved on a horizontal guide bar 42 of the cantilever beam 41 by means of a cogged belt 47 and an electric motor 46. In this embodiment the transfer unit 30 comprises three slides 32, 33, and 34 to which the mounting plates 35, 36, and 37 have been attached. On the other hand, being attached to these, there are altogether ten grip elements 21 for the sample container holders 15, locating in a straight row when slides 32, 33, and 34 are side by side. When the cassette 11 moves from the side to the lifting position, the elements 21 take hold of all the ten sample container holders 15 in the cassette 11 simultaneously.

The grip nails 24 will subsequently lift all the ten sample container holders 15 along with their sample containers 17 simultaneously up out of the cassette 11. The vertical movement has been arranged so that the whole cantilever beam 41 rises on the guide bars 48.

Figure 6:
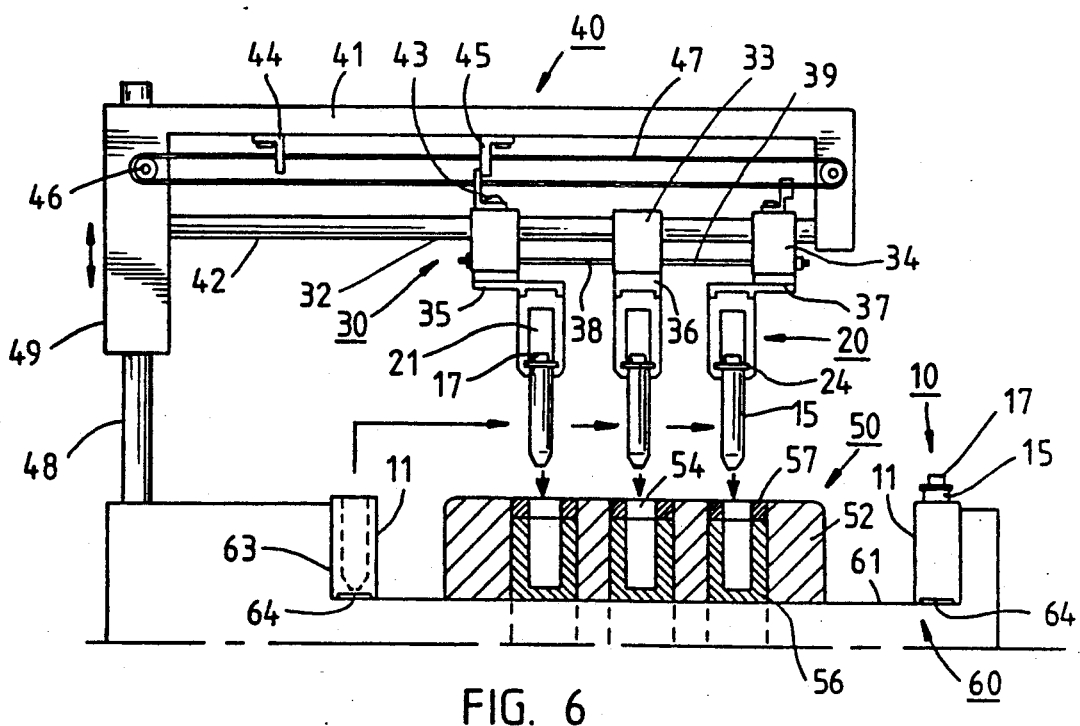
FIG. 6 corresponds to FIG. 5 and shows the gamma counter moving sample container holders into the measuring unit.

FIG. 6 illustrates a situation where the transfer unit 30 of the gamma counter of FIG. 5 has moved the sample container holders 15 of the sample containers 17 in horizontal direction. The mechanism functions so that the sample container holders move to form three rows, being at a distance from each other, so that every sample container comes right above the corresponding hole 54 of the measuring unit 50. The transfer movement is performed so that the electric motor 46 moves the cogged belt 47 having a slide 34 attached thereto, the slide moving on the guide bar 42. Since the slides 32, 33, and 34 are connected to each other by means of limiting bars 38 and 39, being attached to slide 33, the slide 34 will draw the other slides 32 and 33 along.

The lengths of the limiting bars 38 and 39 define the distances between the rows of sample container holders, resting on the grip elements 21, in such a way that they correspond to the distances of the detectors 56 from each other in measuring unit 50 in the direction of the guide bar 42. A stop 45, being attached to the body of the cantilever beam 41, or a sensor stops the transfer movement of slides 32, 33, and 34 exactly in the right position above the measuring unit 50 by means of a stop 43 attached to the slide 32.

After this, the cantilever beam 41 on the whole is lowered and the sample containers 17 along with their holders 15 go down into the measuring hollows 54 where there are ten well-type detectors 56 in three rows. Detectors 56 have been mounted from above down into their hollows and protective rings 57 have been mounted on top of them. Then also the exchange of a detector is easy to do from above.

Reversed movement or the return movement of the sample container and sample container holders into the cassette 11 is performed in reversed order. When the sample containers and sample container holders have been lifted up out of the measuring unit 50, the cogged belt 47, being moved by the electric motor 46, moves the slide 34 in FIG. 6 to the left. Then all slides come adjacent to each other and the slide 34 pushes also the slides 32 and 33. Movement stops when the stop 43, being attached to the slide 32, hits the stop 44, being attached to the body of the cantilever beam 41. From this on the situation corresponds to that shown in FIG. 5.

Figure 7:
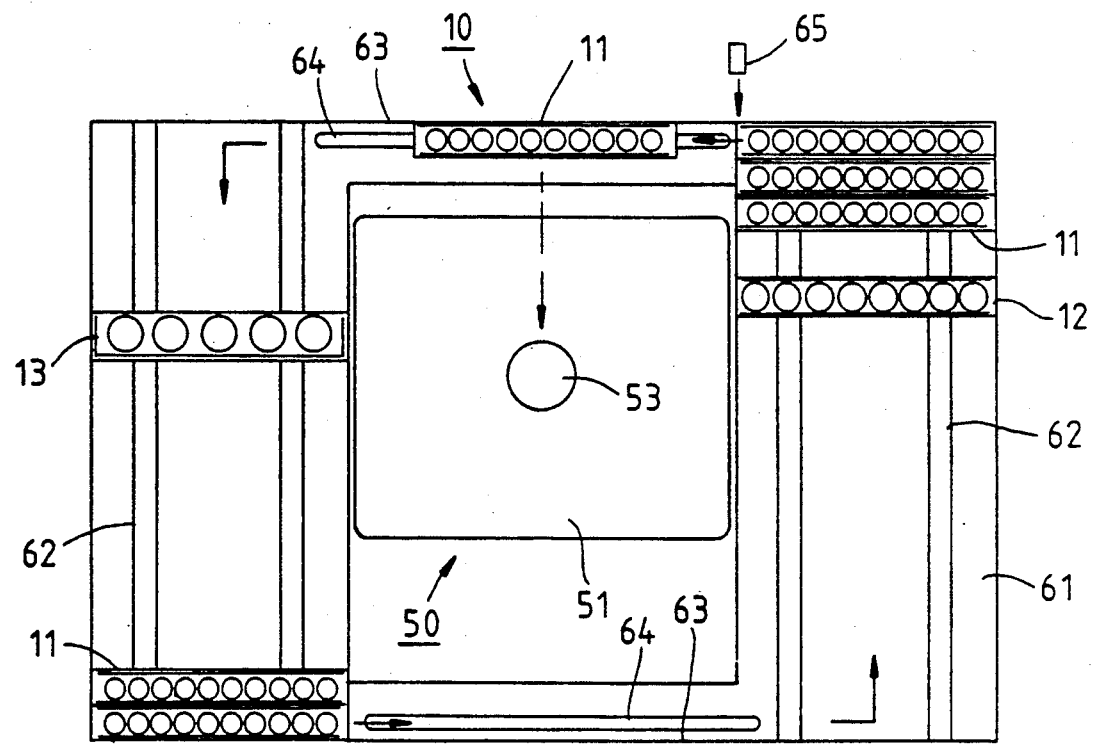
FIG. 7 shows a sectional view taken along the line 7—7 in FIG. 3.

FIG. 7 shows the gamma counter of FIG. 1 viewed from above. In the figure the measuring table 61, having the measuring unit 50 in the middle, forms the cassette transfer unit 60. The measuring unit 50 has a measuring chamber 51 containing one detector. Sample container cassettes 11, 12, and 13 of different widths are placed on the table 61 where they are transferred in turn for measuring by means of cassette transfer unit 60 including conveyors 62. The cassettes rotate along a path around the measuring unit 50. A transducer 65 for identifying cassettes has been placed on the path before the measuring point, the transducer identifying the width of the cassette and the size of the sample containers therein and controlling that suitably sized grip element is transferred above sample containers. This counter is suitable for research work where simultaneous measurement of many samples is generally not required, but the detector is large enough and the walls of the measuring chamber are thick enough.

Figure 8:
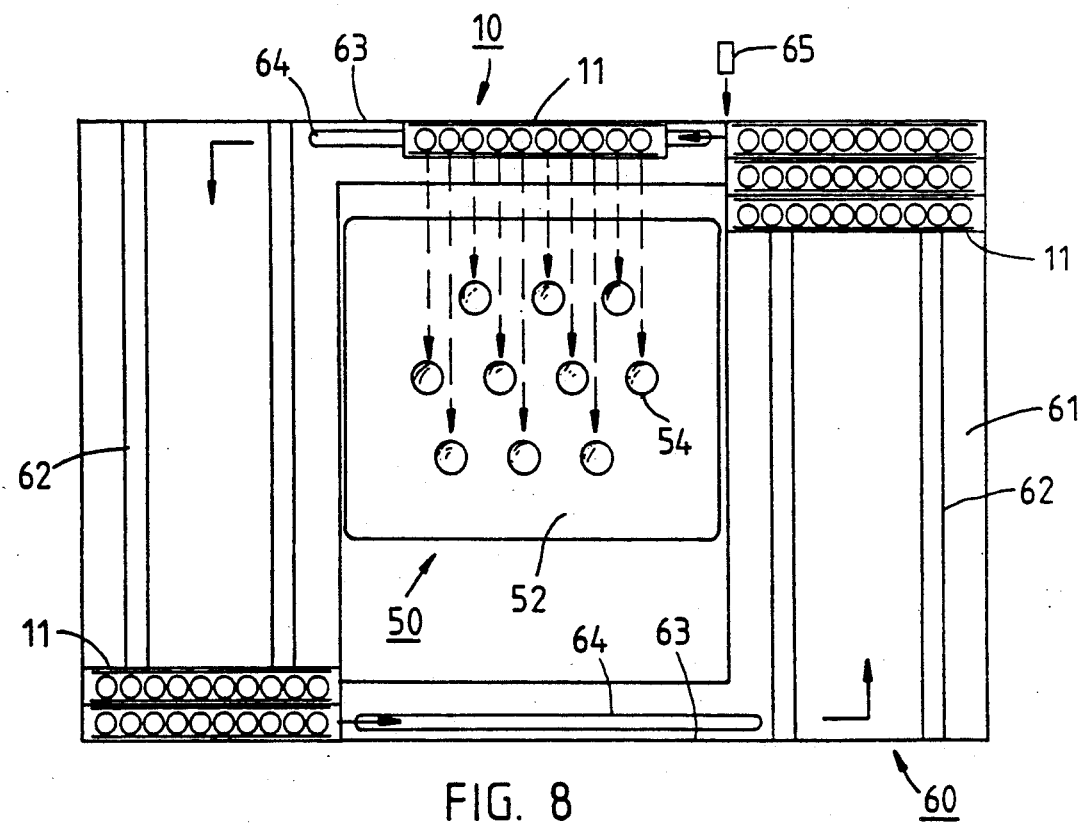
FIG. 8 shows a sectional view taken along the line 8—8 in FIG. 5.

FIG. 8 shows a RIA gamma counter. Measuring table 61, having the measuring unit 50 in the middle, forms the cassette transfer unit 60. The measuring chamber 52 of the measuring unit includes ten detectors arranged in three rows. All sample container cassettes 11 in this device must be the same size. Sample container cassettes 11 are placed on the table 61 where they are transferred in turn for measuring by means of conveyors 62. The cassettes 11 rotate along a path around the measuring unit 50. This device is suitable for use in mass survey where a lot of samples are measured as fast as possible. Then the tracer materials in the samples are generally of low energy and the detectors need not be large and the lead walls of the measuring chamber need not be very thick. The transfer mechanism of the samples is shown in FIGS. 5 and 6 and in greater detail in FIG. 19.

Figure 9:
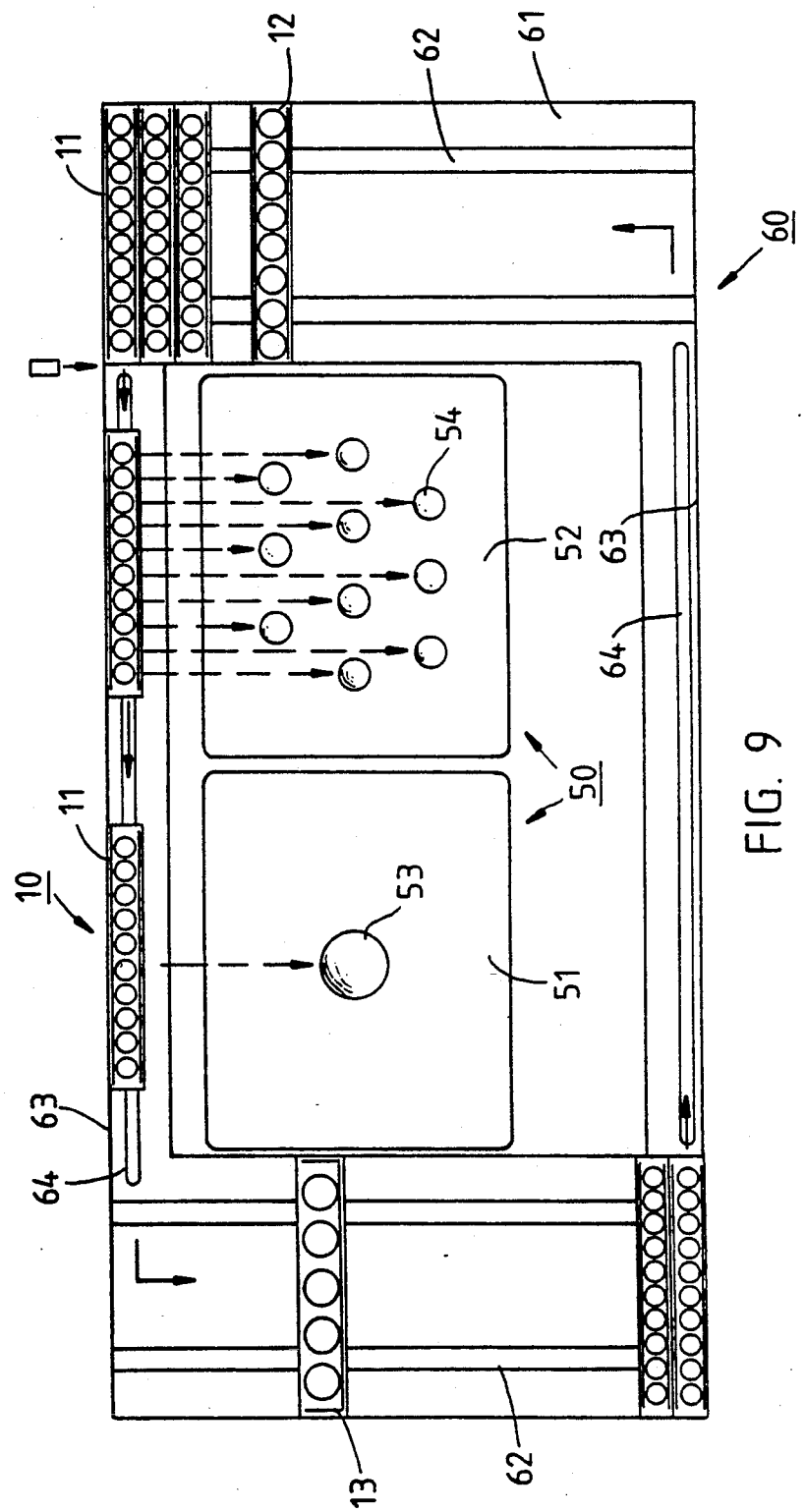
FIG. 9 corresponds to FIG. 7 and shows a third embodiment of the gamma counter viewed from above.

FIG. 9 shows, viewed from above, a gamma counter which is both a research and a RIA device. This device has been formed by combining the devices of FIGS. 7 and 8. In this device the measuring table 61, having two measuring units 50 in the middle, forms the cassette transfer unit 60. One measuring unit comprises a research measuring chamber 51 having one detector, and the other measuring unit comprises a RIA measuring chamber 52 having ten detectors placed in three rows. Sample container cassettes 11, 12, and 13 of different widths can be used in the device.

Sample container cassettes are placed on the table 61 where they are transferred in turn for measuring by means of conveyors 62. The cassettes rotate along a path having a transducer for identifying cassettes placed before the measuring point. The transducer identifies the width of the cassette and the size of the sample containers therein by means of the identification parts of the cassette. In case of a wide or a medium wide cassette, the transducer directs the sample to be individually measured in the research measuring chamber 51.

If, on the other hand, the transducer identifies the cassette to be a narrow one, the samples contained therein can be measured in any of the two measuring chambers. Therefore, the cassette has been provided with an additional identification code like, e.g., a bar code. If this code indicates that the sample is one of low energy, the cassette will be directed to the measuring chamber 52 of the RIA device. If, on the other hand, the sample in question is one of high energy, it will be measured in the research measuring chamber 51 having a larger detector and a thicker lead shield.

Above both measuring units there is a suitably sized lifting device with their grip elements shown separately in FIGS. 1 and 2. One lifting device can thus handle sample containers and holders of different sizes one at a time and the other only sample containers and holders of the same size but even ten at a time.

Figure 10:
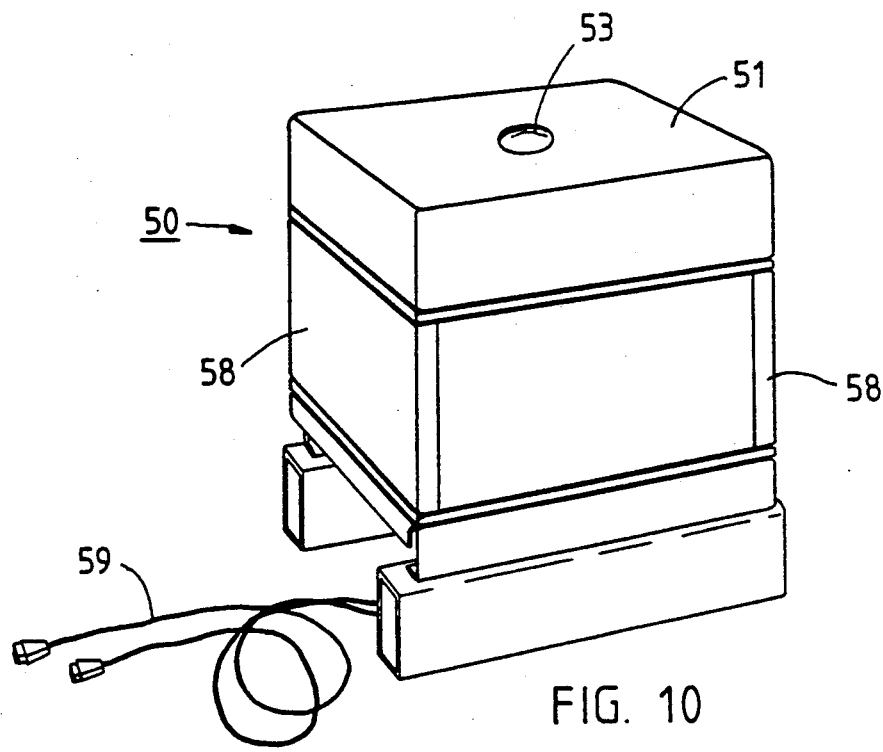
FIG. 10 shows an axonometric view of the measuring unit of the gamma counter of FIG. 1.

FIG. 10 shows the measuring unit 50 of a research device, the measuring chamber 51 having only one large detector. The lead walls 58 of the measuring chamber 51 are thick and sample containers of different sizes can be measured in the device. Leads 59 are connected to the detector.

Figure 11:
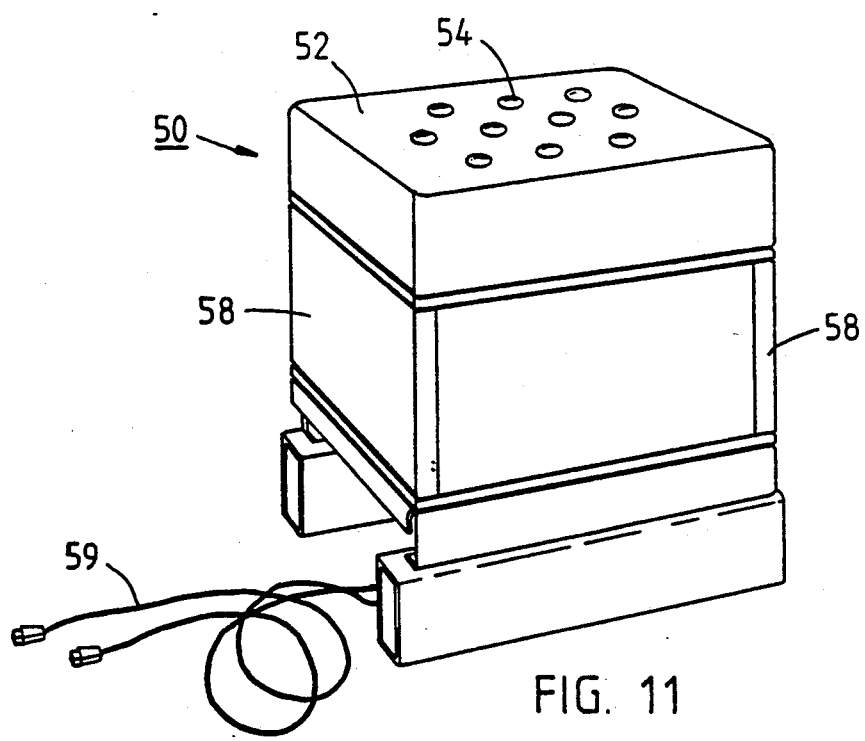
FIG. 11 corresponds to FIG. 10 and shows the measuring unit of the gamma counter of FIG. 2.

FIG. 11 shows the measuring unit 50 of a RIA device, the measuring chamber 52 having ten detectors in three rows and the lead walls 58 being relatively thin.

Figure 12:
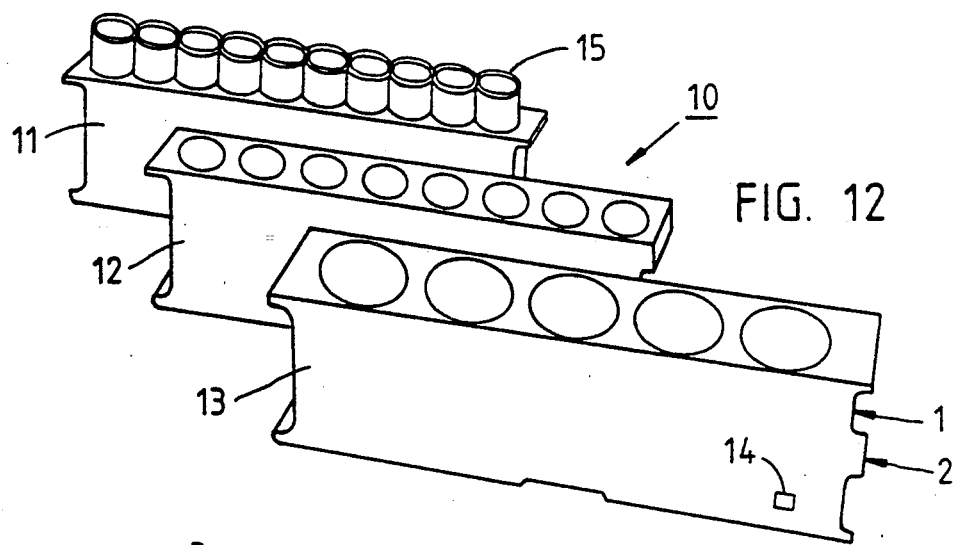
FIG. 12 shows sample container cassettes, being movable on the transfer table, of the gamma counter of FIG. 7.
Figure 13:
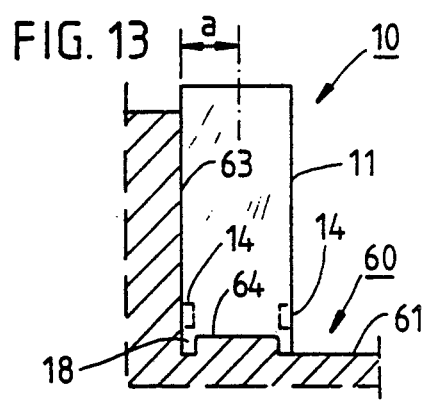
FIG. 13 shows the sample container cassette, viewed from the end, at a position where the samples are lifted into the measuring unit.

FIG. 12 shows three sample container cassettes 11, 12, and 13 of different sizes. Their lengths are the same but the widths are different. The width of the cassette defines the size of sample containers it can take. The narrowest cassette can take ten small sample containers along with their holders. The cassette is then provided with the corresponding number of recesses for the sample container holders. A medium wide cassette takes eight medium-sized sample containers and the widest cassette takes five wide sample container and holders. The gamma counter shown in FIG. 1 can measure all sample container sizes mentioned above. To identify cassettes of different sizes, the end parts of all cassettes have been provided with identification parts 1 and 2. The transducer, placed in connection with the transfer unit, identifies the width of the cassette by the form of the identification part. The sample container cassette 11 is schematically shown in FIG. 13 on the table 61 of the transfer unit 60 at a position where the sample containers and holders are lifted up. It is seen in the figure that there is a guide 64, raising from the surface of the table, formed along the path on the table. A corresponding recess has been formed on the cassette 11 so that on the lower edge of the cassette a guide edge 18 is formed, the width corresponding the distance between the guide 64 on the table and the edge 63 of the table. When the guide edge 18 of the cassette moves in the groove between the guide and the table edge, the cassette stays sideways firmly in place with its other side leaning against the edge 63 of the measuring table. The forward transfer movement of the cassette is performed so that the nail of the pulling device inside the table edge 63 grips the opening 14 on the side wall of the cassette. At the same time, this nail of the pulling device in the opening of the cassette prevents the cassette from rising, the cassette being held firmly on the path 61 also in vertical direction.

Figure 14:
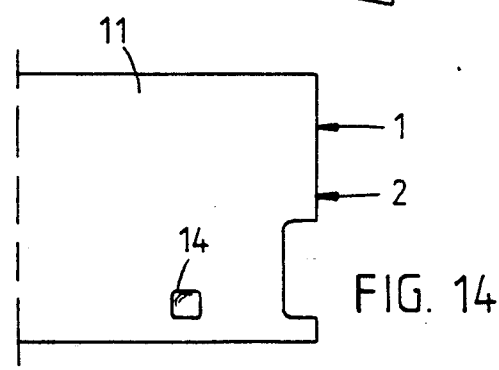
FIG. 14 shows the end of the sample container cassette of FIG. 13 viewed from the side.

FIG. 14 shows as a side view that end of the cassette which comes first to the place where the sample containers and holders are to be lifted. As shown in the figure, the cassette is provided with two identification parts 1 and 2 by means of which the transducer 65 shown in FIG. 7 identifies the width of the cassette. In this cassette, both parts are closed and so the transducer identifies the cassette to be a narrow type. FIG. 14 also shows the hole 14 for the nail of the pulling device locating on the side of the cassette.

Figure 15:
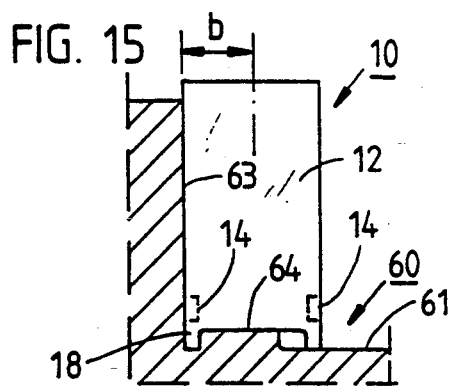
FIG. 15 corresponds to FIG. 13 and shows another embodiment of the sample container cassette.

FIG. 15 shows a medium wide cassette 12. It is shown in the figure that the guide 64 on table 61 and the nail of the pulling device lock also this cassette firmly in place on the path. This is due to the fact that the guiding edge 18 in the lower edge of the cassette is quite similar to that of a narrow cassette, apart from the fact, that the recess under the cassette is wider which is due to the greater width of the cassette. So, one can reliably move cassettes of different widths on the transfer path as long as the width of the gliding edge 18 in their lower edge corresponds to the distance between the guide 64 of the table and the edge 63 of the table from each other.

Figure 16:
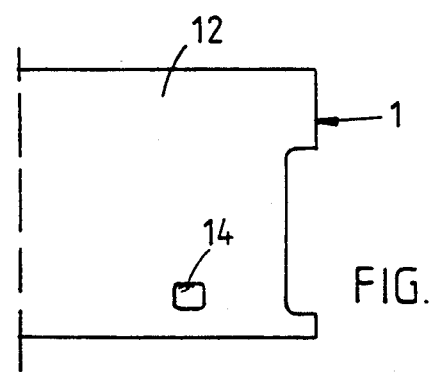
FIG. 16 shows the end part of the sample container cassette of FIG. 15 viewed from the side.

It can be seen in FIG. 16 that a medium wide cassette 13 has been marked for the identification transducer in such a way that only the upper identification part 1 is closed.

Figure 17:
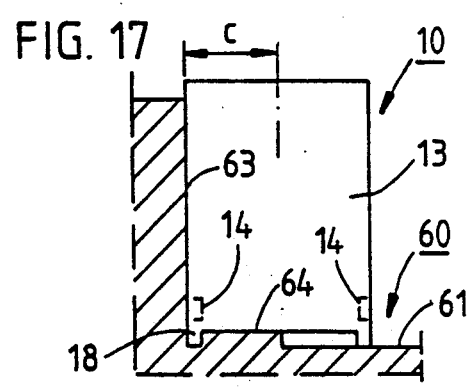
FIG. 17 corresponds to FIG. 13 and shows, a third embodiment of the sample container cassette.
Figure 18:
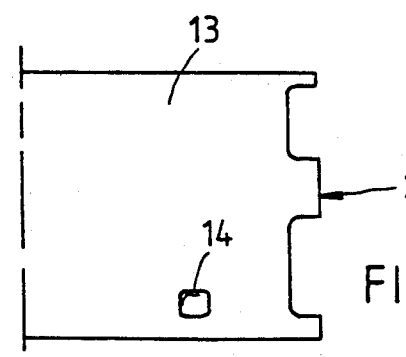
FIG. 18 shows the end of the sample container cassette of FIG. 17 viewed from the side.

FIG. 17 shows a wide cassette 13 whose control is performed exactly in the same way as that of the other cassettes. Only the identification parts are different, as seen in FIG. 18. In this case only the lower identification part 2 is closed.

It can be seen in FIGS. 13, 15, and 17 that the other side of the cassettes 11, 12, and 13 leans against the same edge 63 of the measuring table 61 so that the middle part of a wider sample cassette container remains farther away from the edge than that of a narrow cassette. This distance of the middle part from the edge 63 is marked with letters a, b, and c in the figures.

Since the distance of the middle part of the cassette i.e. a, b, and c varies, the cassette transfer unit in a gamma counter of FIGS. 1 and 3 has been designed to operate so that the slide on the horizontal guide bar is controlled by the information obtained from the identification transducer. Firstly, the right grip element is chosen out of the grip units 21, 22, and 23 shown in FIG. 3. After that, the middle part of the chosen grip element is moved to a distance a, b, or c from the edge 63. Now, the cassette can be moved so that the holder of the sample container moves between the nails 24 of the grip element 21 and the lifting of the sample container holder can start thereafter.

Figure 19:
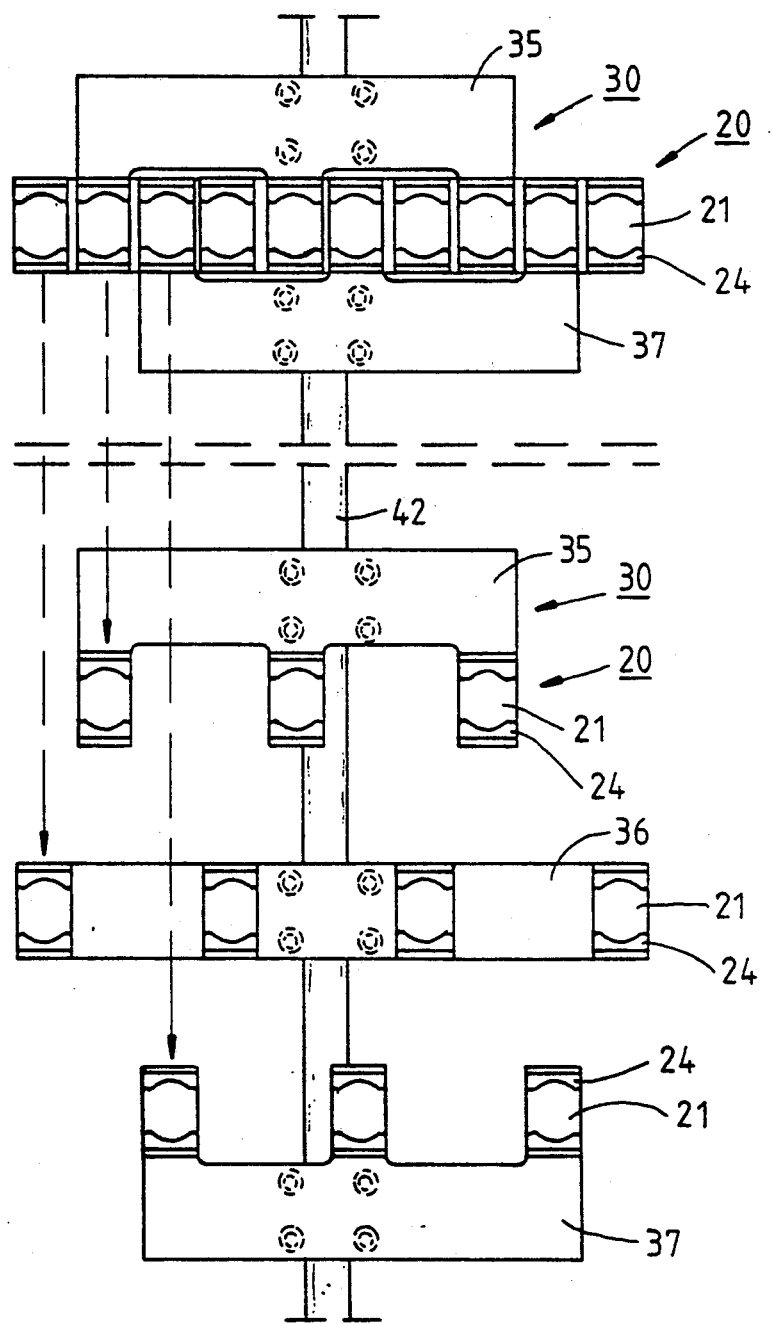
FIG. 19 shows, viewed from behind, the grip elements of the gamma counter of FIG. 1 and schematically their horizontal transfer movement.

In FIG. 19 the grip elements 21 and their mounting plates 35, 36, and 37 of the sample container holders are shown from below. In the upper part of the figure, a situation has been shown where the mounting plates are adjacent to each other, all grip elements 21 being in the same line. In this position, the sample container cassette is transferred from the side under the grip elements or, in FIG. 8 for instance, from right to left. The nails 24 will then grip the edge of the sample container holders so that the holders along with the sample containers can be lifted up and transferred to the measuring unit.

FIG. 19 shows that, while moving horizontally on the guide bar 42, the mounting plates 35, 36, and 37 are separating from each other so that the sample container holders, resting on the grip elements 21, are moving into three rows forming a figure that corresponds to that of FIG. 8 formed by the detectors of the measuring unit 50.

It is obvious to a specialist that the different embodiments of the invention can vary within the scope of the ensuing claims. So a RIA gamma counter can be constructed to contain, e.g., two modules of ten detectors.

I claim:

1. A multipurpose gamma counter enabling measurement of one sample at a time or alternatively two or more samples at a time, the counter comprising a measuring unit and a grip unit for sample containers, at least one of the measuring unit and the grip unit of the sample containers being at least partly formed of replaceable modules so that one or more necessary modular units can be fitted on the gamma counter depending on the measuring method in use at each time.

2. A multipurpose gamma counter according to claim 1 wherein the measuring unit includes a first measuring chamber module having one detector or a second measuring chamber module having two or more detectors fitted on the measuring unit.

3. A multipurpose gamma counter according to claim 2 wherein the dimensions of the first and second measuring chamber modules are principally equal so the first module can be replaced by the second module in a space reserved within the gamma counter.

4. A multipurpose gamma counter according to claim 2 wherein the second measuring chamber module is provided with ten detectors arranged in three rows.

5. A multipurpose gamma counter according to claim 1 wherein at least two measuring chamber modules, which can be chosen arbitrarily depending on the measuring method, can be simultaneously placed side by side on the measuring unit.

6. A multipurpose gamma counter according to any one of claims 1-5 wherein the grip unit for the sample containers is changeably provided with either a first grip module having a least two grip elements of different sizes and/or a second grip module having at least two grip elements of the same size.

7. A multipurpose gamma counter according to claim 6 wherein the grip unit of the sample containers includes the second grip module having ten grip elements of the same size, the grip elements being transferrable from one row into three rows on the same plane.

8. A multipurpose gamma counter according to claim 6 wherein the grip unit includes the first grip module having three grip elements of different sizes.

9. A multipurpose gamma counter according to claim 8 further including, in side-by-side relationship to the first grip module, a second grip module having ten grip elements of the same size, the grip elements being transferrable from one row into three rows on the same plane.

10. A method for sample handling in gamma measurement comprising, moving samples to a gamma counter which has at least two measuring chamber modules, at least one of which is a research measuring chamber module and at least one is a RIA measuring chamber module, identifying each sample in the gamma counter whether the sample is a research sample or a RIA sample, moving samples identified as research samples one at a time into a detector of the research measuring chamber module for measuring, and moving samples identified as RIA samples into a detector of the RIA measuring chamber module for measuring.

* * * * *